Figure 1:
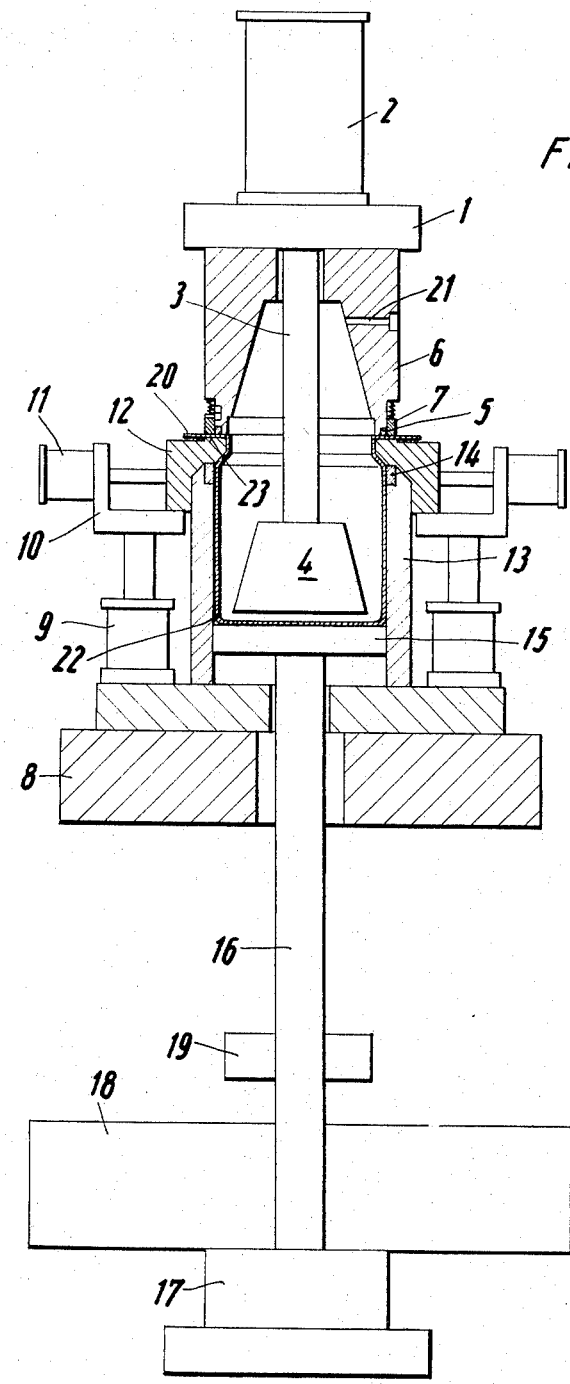

United States Patent [19]
Merklinghaus

[11] 3,784,342
[45] Jan. 8, 1974

[54] APPARATUS FOR DEEP DRAWINGS CONTAINERS OF THERMOPLASTIC FILM MATERIAL

[75] Inventor: Horst Merklinghaus, Hilchenbach-Allenbach, Germany

[73] Assignees: Tedeco, N.V., Deventer, Netherlands; Tedeco Verpackung G.m.b.H., Hamburg, Germany

[22] Filed: Aug. 16, 1972

[21] Appl. No.: 280,975

Related U.S. Application Data

[63] Continuation of Ser. No. 61,361, Aug. 5, 1970, abandoned.

[30] Foreign Application Priority Data
Aug. 6, 1969  Germany............... P 19 39 872.2

[52] U.S. Cl................. 425/292, 425/302, 425/387, 425/DIG. 58
[51] Int. Cl. ............................................. B29c 3/00
[58] Field of Search.................. 425/289, 292, 310, 425/387, 397, 388, 340, 302, DIG. 58

[56] References Cited
UNITED STATES PATENTS

| | | | |
|---|---|---|---|
| 3,259,942 | 7/1966 | Politis | 425/387 X |
| 3,465,071 | 9/1969 | Edwards | 425/397 X |
| 3,510,913 | 5/1970 | Edwards | 425/397 X |
| 3,218,379 | 11/1965 | Edwards | 425/387 X |
| 3,342,914 | 9/1967 | Edwards | 425/388 X |
| 3,357,053 | 12/1967 | Lyon et al. | 425/292 |
| 3,450,807 | 6/1969 | Cheney | 425/388 X |
| 3,121,916 | 2/1964 | Edwards | 425/340 |
| 3,178,771 | 4/1965 | Fischer | 425/302 |
| 3,514,509 | 5/1970 | Hoffer et al. | 425/292 X |

*Primary Examiner*—J. Howard Flint, Jr.
*Attorney*—Robert M. Wolters

[57] ABSTRACT

An apparatus of forming containers of thermoplastic film material, said containers having back-cut portions, said apparatus comprising the means of maintaining the film material preheated into the plasticized range stressed over the opening of a mold means and of urging it into said mold means after a mechanical prestretching by a pneumatic pressurizing against the walls of said mold means until the solidification thereof, the margin of the molded article being severed to the desired dimension and said mold means divided in longitudinal direction being opened for the removal thereof, said apparatus being characterized by the fact that said mold means is opened only within the region having the back-cut portions and a region at least uninterrupted on its circumference being moved along the molded article toward a cutting plate for severing.

5 Claims, 2 Drawing Figures

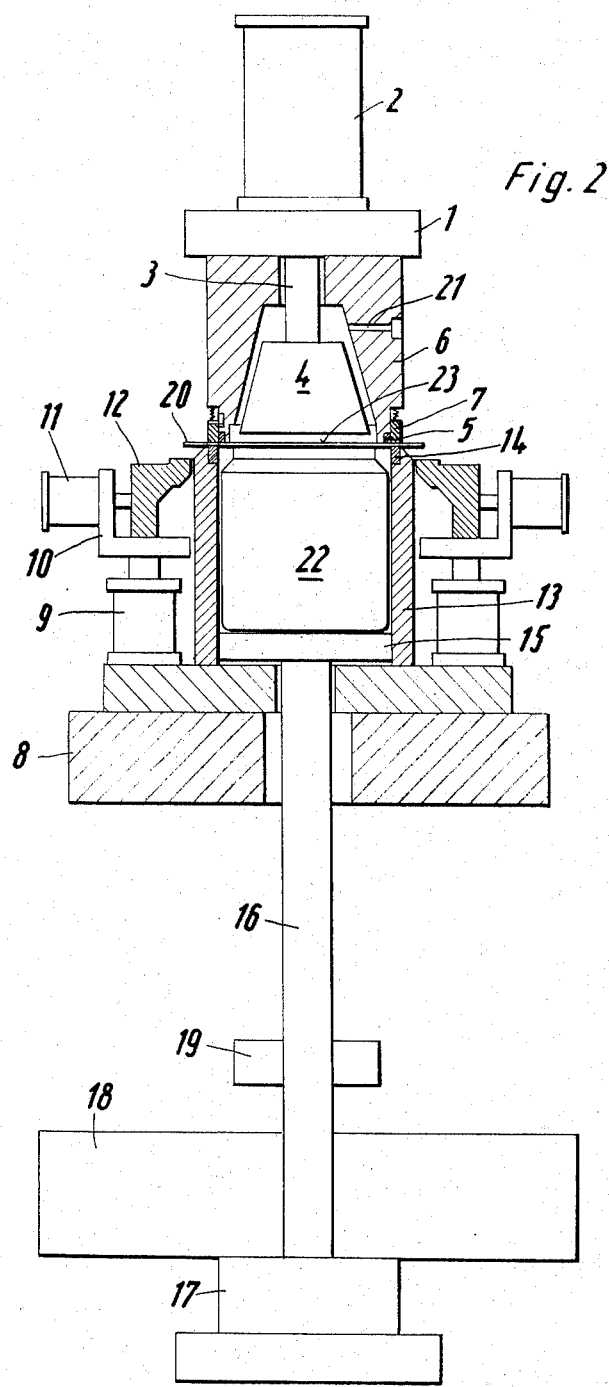

APPARATUS FOR DEEP DRAWINGS CONTAINERS OF THERMOPLASTIC FILM MATERIAL

This is a continuation application of Ser. No. 61,361, filed Aug. 5, 1970, which is now abandoned.

This invention relates to an apparatus for deep-drawing containers of thermoplastic film material, said containers having back-cut portions.

Deep-drawn containers have found broad acceptance for packaging a plurality of substances and articles and in particular also for the packaging of food. In many cases the shape of a downwardly converging steep truncated cone is selected for the containers, the upper rim of which is formed into a flange to which a cover disc is connected by welding after filling the container. This cover disc hermetically seals the container. Such containers are not very demanding regarding the apparatus formed for the manufacture thereof, and therefore they can readily be made with simple tooling. It is a detrimental effect, however, that such containers cannot be readily packed in cartons, boxes and the like for shipment and storing purposes. In the case of a truncated-conical as well as in case of truncated-pyramidal configurations, the narrow edge of the flange projects to all sides together with the cover connected thereto, and the actual containers are spaced relative to one another. In case no particular measures are taken, for instance intermediately disposed cardboard strips or inserted cardboard panels, which center and retain the containers with apertures, containers packed in cartons or boxes can shift and damage each other, in particular under the effect of impacts during transportation.

In order to provide a remedy, containers have already been proposed which are formed substantially cylindrical or square and which have a flange throat-like constriction shortly below the flange receiving the cover disc, from the diameter of which constriction the flange extends to the outer diameter of the substantial portion of the container. Containers formed in this way can be packed together in such a way that their side surfaces or the peripheral lines of their outer surfaces contact each other so that they are in a large-area contact, and in many cases particular measures can thereby be dispensed with when packing, since excessive area pressures which can result in a bursting of the containers are prevented by the large-area contact of the containers among one another. Likewise, these containers are well-stackable by the upper taper. It has been found to be a disadvantage and broadly accepted that containers formed in this way require complicated equipment which is subject to operational trouble. In particular, the severing of the flange or the separating of the container from the plastic film material serving as the forming material has proven to be difficult. When severing, comparatively high forces occur at shear pressures which are transmitted to the two halves of the mold, for the mold must be divided into two because of the back-cut portions, so that it can be opened after forming the molded article. For receiving these forces it is necessary to also at least interlock the individual parts of the mold after the aggregation thereof in order to be able to accept these forces. Extreme attention must be directed to the guiding as well as to the interlocking positions of the parts to be shifted laterally in order to be able to maintain the small cutting gap closely defined. In addition to the presently existing difficulties of providing a two-piece annular knife the further difficulties arise to impart the parts of the knife a precisely defined position for the next severing operation respectively after shifting operations when opening the mold and to uniformly accept the high forces occurring in the severing step. Since this can be approximated in practice only, the problem of high wear arises in addition to the manufacturing difficulties and to the difficulties in the construction of the mold.

The invention provides an apparatus for such packaging containers having backcut portions which permits the cutting operations with a closed annular knife. This will simplify and render more economical the manufacture of the knife as well as the apparatus provided with the knife and will increase the life of the knife.

It is an object and a feature of this invention to solve this problem by opening the mold only within the region provided with the back-cut portions after the conventional preheating, prestretching and pneumatic expansion into the desired shape and by moving at least one region of the mold non-interrupted on its circumference for a cut along the molded article, i.e., in axial direction to a cutting plate.

The apparatus has proven to be well-suited which is formed only in the region of the mold having the back-out portions by separable mold parts laterally retractible, while at least one mold region non-tapered and non-divided in ejecting direction of the molded article is provided, the face of which facing the cutting plate is provided with a cutting edge.

It has been found to bring about good results to provide the inner edge of the non-divided mold region with the cutting edge. It has been recognized to be advantageous to release this cutting edge by an additional axial retraction of the mold parts.

It has been found to be recommendable to press the front surface of the cutting plate against an abutment surface of the mold, in particular of the separable mold parts when the mold is closed. A particularly economical manufacture can be accomplished with such an apparatus by providing it with a plurality of molds in the form of a multiple mold.

With the foregoing object in view, together with such additional objects and advantages as may subsequently appear, the invention resides in the parts, and in the construction, combination and arrangements of parts disclosed, by way of example, in the following specification of certain modes of execution of the invention; reference being had to the accompanying drawings which form a part of said specification and in which drawings:

FIG. 1 is the illustration of an apparatus embodying features of this invention after forming the mold parts and after molding the film material into the molded article, and FIG. 2 is an illustration of the apparatus of FIG. 1 after opening and lowering the separable mold parts as well as lifting the non-divided mold region for the cutting step.

The apparatus of FIGS. 1 and 2 has a stationary bridge 1 which is provided with a fluid cylinder 2 the piston rod 3 of which terminates in a prestretching punch 4. The knife 5 is carried by the punch 6 which in turn is connected to the bridge 1 and serves as a cutting plate. The punch has an axially shiftable depressor 7 at its outer lower end, said depressor being biased by means of spring means in direction to the mold against an abutment.

The apparatus furthermore has a platen 8 provided liftable and lowerable by means of a not illustrated drive, said platen being provided with guide members 10 adjustable in their height by fluid cylinders 9. The guide members 10 contain fluid cylinders 11 by means of which the mold parts 12 are capable of being advanced for closing the mold toward the die 13 and are capable of being retracted again for opening the mold. The die 13 is provided with an annular knife 14 at its upper inner margin. The mold bottom wall 15 closing the die at the bottom is for height adjustment and is carried by the piston rod 16 of a fluid cylinder 17 which is connected to the base plate 18 of the apparatus. The piston rod 16 is provided with a stop ring 19 which limits lowering movements of the platen relative to the mold bottom wall; the limitation is selected in such a way that the mold bottom wall is capable of being advanced a little way beyond the face of the die 13 so that molded articles can be readily removed.

For forming a container first of all the mold is closed, i.e., the fluid cylinders 9 are extended together with the guide members 10, and the fluid cylinders 11 guide the two symmetrical mold parts 12 in direction toward one another in such a way that their cylindrical regions engage the outer periphery of the die 13 and encompass the mold cavity at both sides in forming the mold throat, their free ends contacting each other in the plane of symmetry of the mold extending normal to the drawing plane. Now plastic film material 20 preheated into the plasticized range is inserted and is retained by a further lifting of the platen 8 together with the entire mold between the depressor 7 and the abutment surfaces of the mold parts 12 opposing it, the depressor being lifted from its abutment against the force of the spring biasing it. By a further lifting of the platen under a defined pressure, the face of the punch 6 can also be used for retaining or clamping the plastic film material 20, in case this is a requirement.

The actual molding operation is effected in the conventional way by two method steps: first of all the piston rod 3 is advanced together with the prestretching punch 4 out of the position illustrated in FIG. 2 into the position illustrated in FIG. 1, and the plastic film material 20 is thereby mechanically prestretched. By pressurizing the air supply duct 21 of the punch 6 with compressed air, the plastic film material still in its plasticized condition is urged out of the prestretched position against the walls of the mold and assumes the shape thereof. By cooling and when engaging the walls of the mold, respectively, the film material loses its plasticity and results in the molded article 22 illustrated in FIG. 1 which is capable of being used as a container for various purposes. In the embodiment the container shape is substantially cylindrical, and the upper rim is formed into a flange the outer diameter of which corresponds to that of the cylindrical region of the molded article. Underneath the flange 23, the container is constricted bottle-neck like. The shape of the container does not only cover a cylindrical configuration, rather it can also be selected in any desired shape.

For severing the flange or for separating the flange out of plastic film material or a plastic film web, first of all the mold parts 12 are retracted in order to release the constricted portion of the container. By an opposite pressurizing of the fluid cylinder 11 of the guide members 10 the mold parts 12 are retracted, and subsequently by an according pressurization of the fluid cylinders 9 the guide members 10 are lower together with the mold parts 12 in relationship to the platen 8 and the die 13 connected thereto, so that the face of the die is located free. It has proven to be particularly satisfactory to lower the platen 8 by a little degree prior to opening the upper molding region by laterally moving apart the mold parts 12 in order to be able to open the mold free of transversely acting forces. After the mold is opened, the cutting step can be performed. The mold bottom wall 15 is maintained in the position it has assumed, and the platen 8 is lifted until the cutting knife 14 has its edges underneath the flange 23 underneath the depressor. By a short further stroke the face of the depressor 7 is urged back beind the face of the punch 6, and upon passing of the cutting edges of the knife 5 and 14, the flange 23 is cut out of the plastic film material 20.

Subsequently the platen 8 is lowered to the limit ring 19 so that the molded article severed out of the plastic film material is freely positioned on the mold bottom wall 15. After a slight lowering of the mold bottom wall, the molded article 22 can be removed from the apparatus.

The apparatus of this invention has the distinctive advantage that molded articles can be formed having back-cut portions without it being necessary to divide the entire tool along a longitudinal plane and to open it for removing the article. The stationary die at the same time is provided for guiding and centering the separable mold parts 12 so that particularly precise and thus costly guide means can be dispensed with. Since the mold parts are only stressed with moderate forces and in particular are not loaded by the high cutting pressure occurring during the cutting step, it is not necessary to provide particularly heavy-duty drive and guide means. The face of the die 13 is released by the complete retraction and lowering of the mold parts 12, and it can be formed as a knife or be provided to receive a knife. Since the die 13 and thus the knife 14 carried by it each are formed in one piece, it is not necessary to make particular provisions for receiving the cutting forces as a result of the stresses caused by the cutting step, like this would have been necessary when dividing the knife as well as the mold. A simple-construction highly loadable apparatus is thereby obtained in which the centric guiding of the upper die edge serving as a movable knife can easily be accomplished. As a result of the good guiding effect, however, the cutting gap can also be uniformly adjusted, and the adjustment is maintained over a long period of time so that a clean cut as well as low wear are always insured.

The apparatus used for the forming of containers can be further developed. So for instance more than two mold parts can be provided within one region, and it is also possible to arrange separable mold parts in more than one region if more than one region having back-cut portions for the predetermined molded article are intended. The construction of the mold according to this invention can even be used, however, in case no punch cut is to be effected within the mold. Therefore it is possible to use the tool illustrated by way of example in the figures for forming and separating molded articles, while a similar tool is used for closing, i.e., for welding the molded containers, which likewise comprises a die and two mold parts 12 as well as possibly a mold bottom wall. The manufacture of such a tool can be performed economical in particular for the reason that the same parts are used for the tool for molding and punching, as they are for the welding station, and the drawings as well as the operations in the workshop are identical for both tools.

Notwithstanding the illustrated uses of the invention and the manners by which such uses may be achieved, it is appreciated that changes and modifications will suggest themselves to others skilled in the art both for uses similar to those illustrated as well as for other uses. The invention, therefore, is not to be deemed to be limited to the exact modes of execution above disclosed by way of example, and it will be understood that the invention embraces all such changes and modifications in the parts, and in the construction, combination and arrangement of parts as shall come within the purview of the appended claims.

I claim:

1. Apparatus for the production of containers with restricted throat portions, comprising in combination: die means having integral fixed vertical peripheral wall means with continuous peripheral knife means formed at the upper edge thereof, a movable bottom wall inwardly of said wall means to form a cavity for receiving sheet material therein to be formed into a container; mold element means at the top of said die means, said mold element means being radially movable inwardly and outwardly relative to said die means, said mold element means being at its radially inward position inwardly of said continuous peripheral knife means forming a peripherally inwardly offset continuation of said wall means when sheet material is being formed into a container, said mold element means being moved to it radially outward position clear of said continuous peripheral knife means and the vertical walls after the container is formed; punch means positioned in registry with said continuous peripheral knife means and engageable with the outwardly directed periphery of the sheet material during forming of the container and cooperable with said mold element means when in the inward position to hold the sheet material in place during forming the container, and pressure forming means associated with said punch means for urging the sheet material into firm contact with said side wall means and bottom wall of said die means and into contact with said mold element means thereby forming the container with a restricted throat portion; said die means with its continuous peripheral knife means being movable toward said punch means when said mold element means are moved to the outward position for cutting the outwardly directed periphery of the sheet material and forming a flange on the formed container outwardly of the restricted throat portion after said container is formed, said bottom wall being movable relating to said side wall means to allow the container to be removed from the die means.

2. The apparatus for the production of containers according to claim 1, wherein said mold element means is formed of a two pieced split collar arrangement which is moved in diametrically opposed directions to remove the mold element from between said punch means and said continuous peripheral knife means.

3. The apparatus for the production of containers according to claim 1, further including an annular axially shiftable depressor member positioned about said punch and in spaced alignment from said continuous peripheral knife means firmly to hold the outwardly directed periphery of the plastic material being formed into a container between said die means and said punch means.

4. The apparatus for the production of containers according to claim 1, wherein said die means is supported on a movable platen, said platen being movable relative to the movable bottom wall of said die means, adjustable guide means secured to said movable platen and extending upwardly therefrom for supporting said mold element means, and actuator means secured to said adjustable guide members and connected to said mold element means for actuation radially inwardly and outwardly for movement of said mold element means.

5. The apparatus for the production of containers according to claim 1, wherein said pressure forming means includes means adapted to be in fluid communication with a supply of air pressure, said air pressure assisting said forming means for ultimately urging the plastic material in firm contact with the side and bottom walls of said die means.

* * * * *